(12) United States Patent
Tsujide

(10) Patent No.: US 9,396,060 B2
(45) Date of Patent: Jul. 19, 2016

(54) INFORMATION PROCESSING METHOD, INFORMATION PROCESSING DEVICE AND RECORDING MEDIUM

(71) Applicant: FUJITSU LIMITED, Kawasaki-shi, Kanagawa (JP)

(72) Inventor: Hisashi Tsujide, Takarazuka (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 14/136,216

(22) Filed: Dec. 20, 2013

(65) Prior Publication Data

US 2014/0181598 A1 Jun. 26, 2014

(30) Foreign Application Priority Data

Dec. 26, 2012 (JP) ................................. 2012-283489

(51) Int. Cl.
*G06F 11/00* (2006.01)
*G06F 11/07* (2006.01)

(52) U.S. Cl.
CPC ........ *G06F 11/0793* (2013.01); *G06F 11/0709* (2013.01); *G06F 11/0766* (2013.01)

(58) Field of Classification Search
CPC ............ G06F 11/0793; G06F 11/0709; G06F 11/0766; G06F 11/0775
See application file for complete search history.

(56) References Cited

U.S. PATENT DOCUMENTS

| | | | | |
|---|---|---|---|---|
| 2003/0101385 A1* | 5/2003 | Lee | .................................. | 714/48 |
| 2005/0086340 A1* | 4/2005 | Kang et al. | ..................... | 709/224 |
| 2005/0223374 A1* | 10/2005 | Wishart et al. | ................. | 717/173 |
| 2009/0031174 A1* | 1/2009 | Moon | ............................. | 714/47 |
| 2014/0365829 A1* | 12/2014 | Higuchi | .......................... | 714/37 |

FOREIGN PATENT DOCUMENTS

| | | |
|---|---|---|
| JP | 2003-067222 | 3/2003 |
| JP | 2009-043029 | 2/2009 |

* cited by examiner

*Primary Examiner* — Philip Guyton
(74) *Attorney, Agent, or Firm* — Staas & Halsey LLP

(57) ABSTRACT

An information processing method includes: obtaining, when an operation control in an automatic operation process used for automatically executing an operation control for a plurality of computers is executed, when an error is detected in a first computer among the plurality of computers is executed, first information that indicates the role of the first computer and second information that indicates the configuration of a system to which the first computer belongs; and obtaining case data including a condition that matches or is similar to a condition that includes at least the contents of the operation control, the contents of the error, the role of the first computer indicated by the first information and the configuration of the system to which the first computer belongs which is indicated in the second information.

15 Claims, 27 Drawing Sheets

FIG. 6

```
<System Information>
  <InstalledSoftware    softwareName="XXX Web Server">
    .
    .
```

FIG. 7

| SOFTWARE NAME | SOFTWARE PARAMETER | SERVER ROLE |
|---|---|---|
| XXX WEB SERVER | VALUE AAA=ON | WEB |
| YYY MANAGE SOFTWARE | | DB |
| ⋮ | ⋮ | ⋮ |

FIG. 8

| EXISTING ELEMENT IN SERVER GROUP | SERVER STRUCTURE |
|---|---|
| WEB,AP,DB | WEB-AP-DB |
| WEB x N,AP,DB | WEB-AP-DB,WEB-LOAD-BALANCING |
| ⋮ | ⋮ |

FIG. 10

| ELEMENT NAME | PARENT ELEMENT | ELEMENT DISCRIPTION | COMPONENT NAME | COMPONENT TYPE | COMPONENT DISCRIPTION | DATA TYPE |
|---|---|---|---|---|---|---|
| SYSTEM INFORMATION | | SYSTEM INFORMATION OF SERVER | ID | ATTRIBUTE | UNIQUE IDENTIFIER | ID |
| | | | LAST UPDATE | ATTRIBUTE | INFORMATION UPDATE DATE | DATE TIME |
| | | | IP ADDRESS | ATTRIBUTE | IP ADDRESS | STRING |
| | | | HOST NAME | ATTRIBUTE | HOST NAME | STRING |
| | | | SERVER ROLE | ATTRIBUTE | ROLE OF SERVER | STRING |
| | | | SERVER STRUCTURE | ATTRIBUTE | CONFIGURATION TO WHICH SERVER BELONGS | STRING |
| HARD PARAMETER | SYSTEM INFORMATION | HARD RELATED PARAMETER | CPU CLOCK | ATTRIBUTE | CPU CLOCK NUMBER | STRING |
| | | | MEMORY SIZE | ATTRIBUTE | PHYSICAL MEMORY SIZE | STRING |
| | | | DISK SIZE | ATTRIBUTE | FREE DRIVE CAPACITY | STRING |
| | | | HDD CAPACITY | ATTRIBUTE | HDD CAPACITY | STRING |
| OS PARAMETER | SYSTEM INFORMATION | OS RELATED TUNING PARAMETER | OS TYPE | ATTRIBUTE | OS TYPE | STRING |
| KERNEL PARAMETER | OS PARAMETER | KERNEL PARAMETER | VIRTUAL MEMORY SIZE | ATTRIBUTE | VIRTUAL MEMORY SIZE | STRING |
| | | | ... | ATTRIBUTE | | STRING |
| INSTALLED SOFTWARE | SYSTEM INFORMATION | INSTALLED SOFTWARE | SOFTWARE NAME | ATTRIBUTE | SOFTWARE | STRING |
| SOFTWARE PARAMETER | INSTALLED SOFTWARE | APPLICATION RELATED TUNING PARAMETER | ... | ATTRIBUTE | ... | STRING |
| | | | ... | ATTRIBUTE | ... | STRING |

FIG. 14

| ELEMENT NAME | PARENT ELEMENT | ELEMENT DISCRIPTION | COMPONENT NAME | COMPONENT TYPE | COMPONENT DISCRIPTION | DATA TYPE |
|---|---|---|---|---|---|---|
| EVENT INFORMATION | — | INFORMATION OF SIMILAR CASE | ID | ATTRIBUTE | UNIQUE IDENTIFIER | ID |
| | | | EVENT NAME | ATTRIBUTE | CASE NAME | STRING |
| | | | LAST UPDATE | ATTRIBUTE | INFORMATION UPDATE DATE | DATE TIME |
| | | | SYSTEM INFORMATION | ELEMENT | SYSTEM INFORMATION | |
| | | | SYSTEM DIFFERENCE | ELEMENT | DIFFERENCE IN SYSTEM INFORMATION | |
| | | | ERROR INFORMATION | ELEMENT | INFORMATION OF ERROR WHICH HAS OCCURRED | |
| | | | RESOLUTION INFORMATION | ELEMENT | HANDLING METHOD FOR HANDLING ERROR | |
| ERROR INFORMATION | EVENT INFORMATION | INFORMATION OF ERROR WHICH HAS OCCURRED | ERROR TYPE | ATTRIBUTE | TYPE OF ERROR WHICH HAS OCCURRED | STRING |
| | | | ERROR CODE | ATTRIBUTE | ERROR CODE | STRING |
| | | | ERROR MESSAGE | ATTRIBUTE | ERROR MESSAGE | STRING |
| | | | OPERATION INFO | ELEMENT | EXECUTED OPERATION CONTROL | |
| OPERATION INFO | ERROR INFORMATION | EXECUTED OPERATION CONTROL | OPERATION TYPE | ATTRIBUTE | OPERATION CONTROL TYPE | STRING |
| | | | OPERATION COMMAND | ATTRIBUTE | OPERATION CONTROL CONTENTS | STRING |
| | | | ... | ... | ... | STRING |
| RESOLUTION INFORMATION | EVENT INFORMATION | HANDLING METHOD FOR HANDLING ERROR | RESOLUTION TYPE | ATTRIBUTE | HANDLING METHOD TYPE | STRING |
| | | | RESOLUTION COMMAND | ELEMENT | HANDLING METHOD CONTENTS | STRING |
| | | | RESOLUTION SERVER ROLE | ATTRIBUTE | ROLE OF SERVER ON WHICH HANDLING HAS BEEN PERFORMED | STRING |
| | | | SYSTEM INFORMATION | ELEMENT | SYSTEM INFORMATION OF SERVER ON WHICH HANDLING HAS BEEN PERFORMED | |
| | | | ... | ATTRIBUTE | ... | |
| RESOLUTION COMMAND | RESOLUTION INFORMATION | CONTENTS OF HANDLING METHOD | COMMAND | ATTRIBUTE | HANDLING METHOD CONTENTS | STRING |
| | | | PARAMETER | ELEMENT | PARAMETER OF HANDLING METHOD | STRING |
| | | | CONFIRMATION | ELEMENT | CONFIRMATION METHOD FOR CONFIRMING HANDLING METHOD | STRING |

FIG. 16

| OPERATION CONTROL | : 90 |
| ERROR CONTENTS | : 85 |
| AMOUNT OF CHANGE | : 90 |
| SYSTEM INFORMATION | : 90 |
| ROLE OF SERVER AND CONFIGURATION OF SYSTEM | : 100 |
| TOTAL | 455 |

FIG. 20

```
[HARD]
ACTUAL MEMORY        : 4000
    [OS]
VIRTUAL MEMORY       : 1000
  [MIDDLE A]
ACCESS MULTIPLICITY  : 50
ALLOCATED MEMORY     : 30
```

FIG. 21

```
    [HARD]
  ACTUAL MEMORY        : 5000
     [OS]
  VIRTUAL MEMORY       : 1000
   [MIDDLE A]
  ACCESS MULTIPLICITY  : 60
  ALLOCATED MEMORY     : 40
```

FIG. 22A

| ERROR TYPE | : PHYSICAL MEMORY |
|---|---|
| [HARD] | |
| ACTUAL MEMORY | : 1.5 |
| [OS] | |
| VIRTUAL MEMORY | : 1.5 |
| [MIDDLE A] | |
| ACCESS MULTIPLICITY | : 1 |
| ALLOCATED MEMORY | : 1.2 |

FIG. 22B

| ERROR TYPE | : DISC SPACE |
|---|---|
| [HARD] | |
| ACTUAL MEMORY | : 0.8 |
| [OS] | |
| VIRTUAL MEMORY | : 0.8 |
| [MIDDLE A] | |
| ACCESS MULTIPLICITY | : 2 |
| ALLOCATED MEMORY | : 0.8 |

FIG. 24
HANDLING TYPE: COMMAND EXECUTION
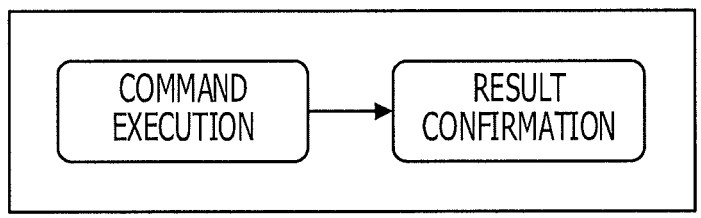
HANDLING TYPE: FILE EDITING
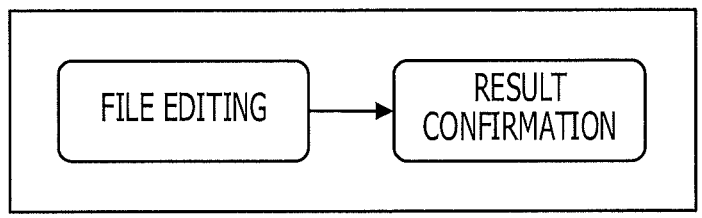

INFORMATION PROCESSING METHOD, INFORMATION PROCESSING DEVICE AND RECORDING MEDIUM

CROSS-REFERENCE TO RELATED APPLICATION

This application is based upon and claims the benefit of priority of the prior Japanese Patent Application No. 2012-283489, filed on Dec. 26, 2012, the entire contents of which are incorporated herein by reference.

FIELD

The embodiments discussed herein are related to a technology of automating an operation control of a system.

BACKGROUND

In the past, in an information technology (IT) system, a data center, and the like, operation management of the IT system is performed in accordance with an operation procedure manual. However, as the scale of the IT system has increased, the cost for operation management has increased, and therefore, a measure for addressing increase in cost is demanded.

Then, as a measure for addressing increase in cost, applications that automate operation procedures to reduce operation management cost have been provided. In general, for such an application, a method is used in which a component (startup and stop of a server, and the like) in which each of individual operation controls in operation procedures is abstracted is prepared and a flow including automated operation procedures is created by combining such components, and then, the flow is executed.

Although there are various technologies of automatically extracting, when an error occurs on a system, a handling method for handling the error, there are cases where an appropriate handling method is not extracted. In many cases, reasons for this are that a feature of a computer in which an error has occurred on which focus is presumably to be put is not used, that the configuration of the system which dynamically changes is not correctly recognized, and the like.

Japanese Laid-open Patent Publication No. 2009-43029 discusses an example of the related art.

SUMMARY

According to an aspect of the invention, an information processing method includes: obtaining, when an operation control in an automatic operation process used for automatically executing an operation control for a plurality of computers is executed, when an error is detected in a first computer among the plurality of computers is executed, first information that indicates the role of the first computer and second information that indicates the configuration of a system to which the first computer belongs; and obtaining case data including a condition that matches or is similar to a condition that includes at least the contents of the operation control, the contents of the error, the role of the first computer indicated by the first information and the configuration of the system to which the first computer belongs which is indicated in the second information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data obtained at registration of an automatic operation process;

FIG. 7 is a table illustrating an example of data stored in a setting data storage unit;

FIG. 8 is a table illustrating an example of data stored in a setting data storage unit;

FIG. 10 is a table illustrating an example format of configuration information registered in CMDB;

FIG. 14 is a table illustrating an example format of a similar case registered in CMDB;

FIG. 16 is a diagram illustrating an example of score calculation;

FIG. 20 is a diagram illustrating examples of system parameter values for a system in a similar case;

FIG. 21 is a diagram illustrating examples of system parameter values for an error occurrence system in a similar case;

FIG. 22A is a diagram illustrating an example of weighting data used for adjustment coefficient calculation;

FIG. 22B is a diagram illustrating an example of weighting data used for adjustment coefficient calculation;

FIG. 24 is a diagram illustrating model data of an error handling process flow;

DESCRIPTION OF EMBODIMENTS

Figure 1:
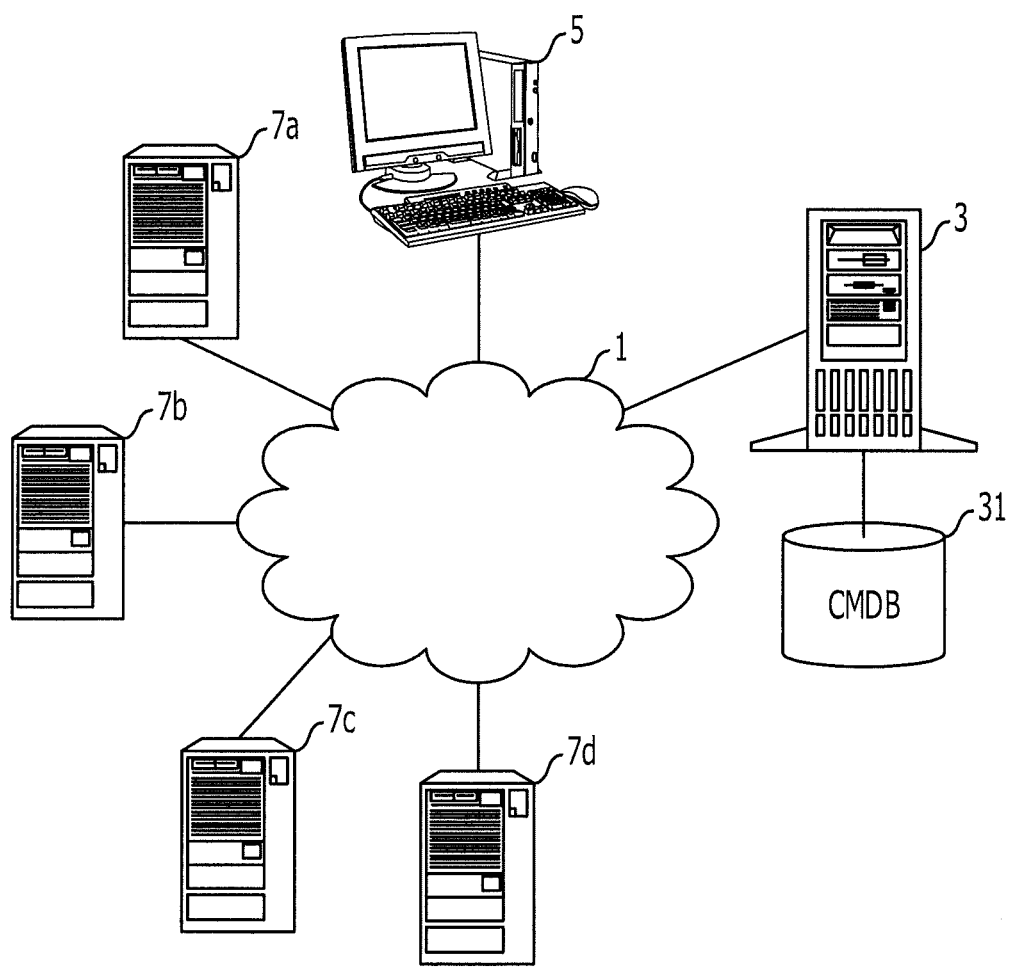
FIG. 1 is a diagram illustrating an example system configuration.

Hereinafter, FIG. 1 illustrates a configuration example of a system according to this embodiment. In the system according to this embodiment, a management server 3, an operator terminal 5, and various types of servers 7a, 7b, 7c, and 7d which are to be managed are coupled to a network 1. The number of various types of servers 7 is not limited to four, and there may be cases where more servers than four are coupled to the network 1 and also cases where fewer servers than four are coupled to the network. The operator terminal 5 is, for example, a personal computer, and is operated by an operator to store setting data in the management server 3, register an automatic operation process and model data of a handling flow performed in order to handle an error, and manually handle an error.

The management server 3 manages a configuration management database (CMDB) 31, executes an automatic operation process in a manner described below, and executes processing for handing an error which occurs when the automatic operation process is executed.

Figure 2:
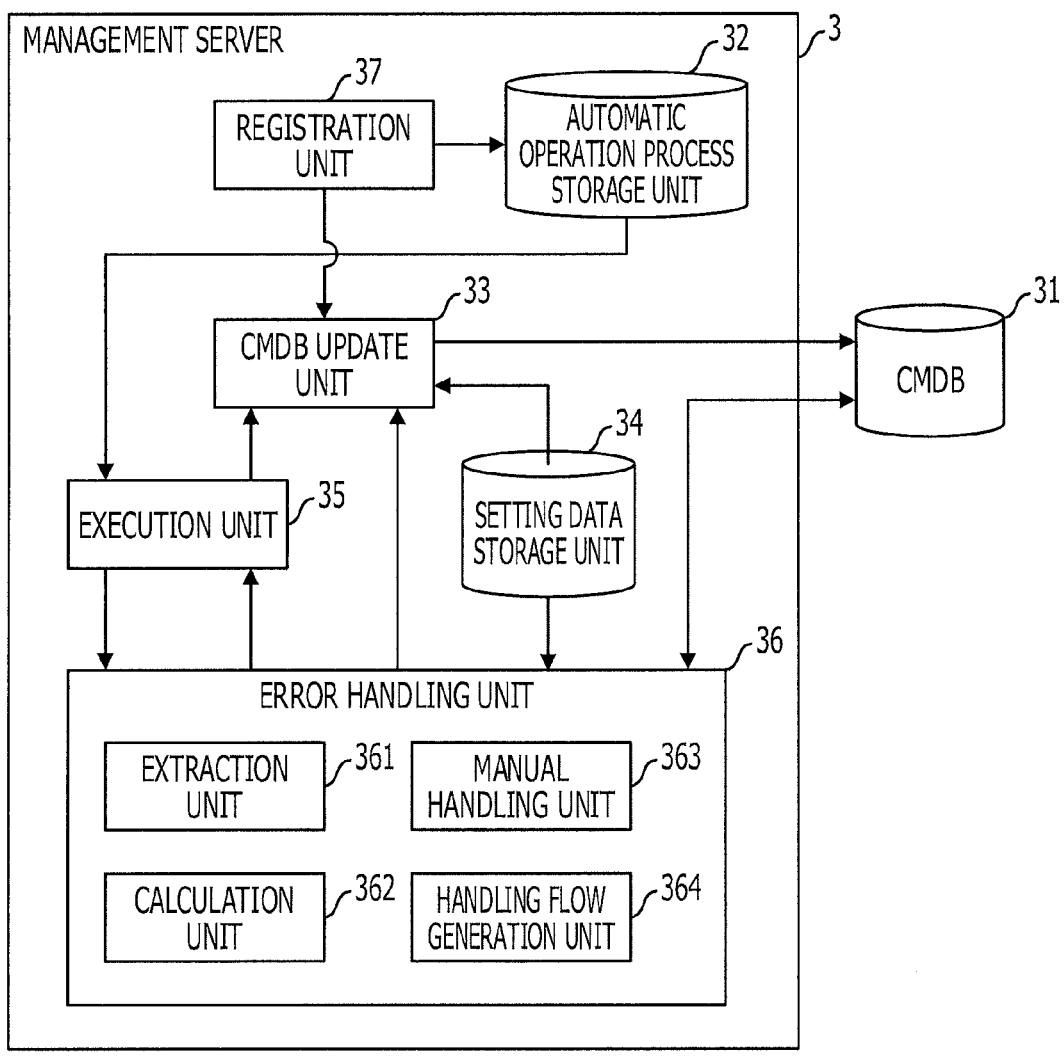
FIG. 2 is a function block diagram of a management server.

FIG. 2 illustrates a function block diagram of the management server 3. The management server 3 includes an automatic operation process storage unit 32, a CMDB update unit 33, a setting data storage unit 34, an execution unit 35, an error handing unit 36, and a registration unit 37. The error handing unit 36 includes an extraction unit 361, a calculation unit 362, a manual handling unit 363, and a handling flow generation unit 364.

The registration unit 37 receives, for example, an automatic operation process from the operator terminal 5 and stores the automatic operation process in the automatic operation process storage unit 32. The CMDB update unit 33 executes update processing for the CMDB 31 in accordance with an instruction sent from the registration unit 37 or the execution unit 35. In update processing, setting data stored in the setting data storage unit 34 is used.

The execution unit 35 executes predetermined operation control for the servers 7a-7d in accordance with the automatic operation process stored in the automatic operation process storage unit 32. In this case, an instruction for performing update processing for the CMDB 31 is given to the CMDB update unit 33. Furthermore, when the execution unit 35 detects an error at execution of operation control defined in the automatic operation process, the execution unit 35 outputs data of the automatic operation process to the error handing unit 36 to cause the execution of processing.

The extraction unit 361 of the error handing unit 36 extracts the same case or a similar case in terms of the error from the CMDB 31 in accordance with the detection of error occurrence. The calculation unit 362 of the error handing unit 36 calculates a parameter value which is to be used for a handing method in accordance with the setting data stored in the setting data storage unit 34. Then, the handling flow generation unit 364 generates an error handling flow using model data of an error handling flow stored in the setting data storage unit 34, data of a handling method, and the calculated parameter value, and outputs the generated error handing flow to the execution unit 35. The execution unit 35 executes control in accordance with the error handling flow. Note that, when a similar case is not extracted, the manual handling unit 363 performs error handling in accordance with an instruction sent from the operator terminal 5 and causes the CMDB update unit 33 to register data including a handling method in the CMDB 31. Also, when handling is automatically performed, also, data including a handling method is registered in the CMDB 31.

Figure 3:
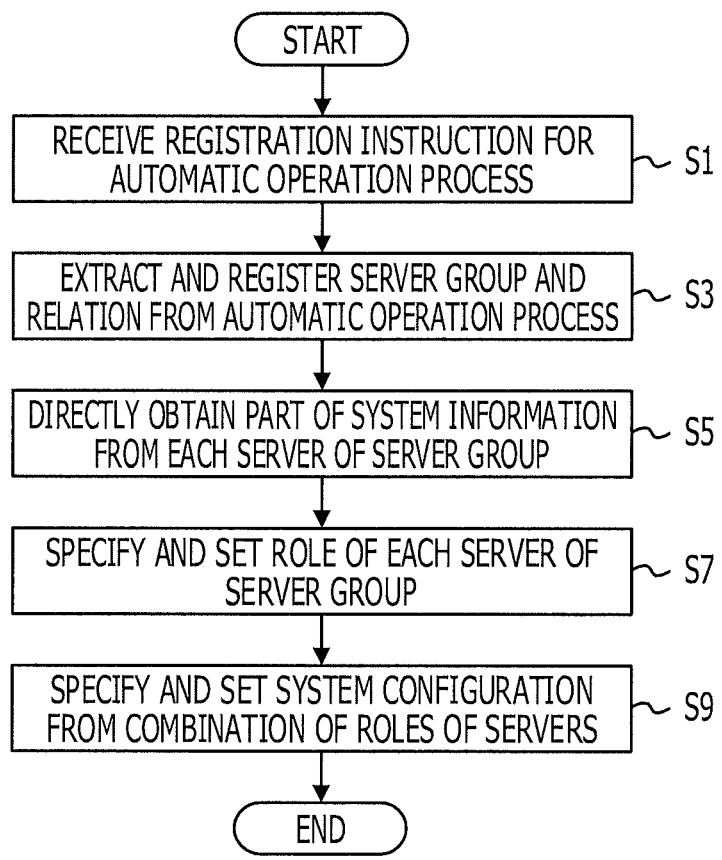
FIG. 3 is a flowchart illustrating a process flow performed at registration of automatic operation process.

Next, contents of processing performed by the management server 3 will be described with reference to FIGS. 3-25. First, the registration unit 37 receives a registration instruction for an automatic operation process, which includes data of the automatic operation process, from the operator terminal 5 and the like (Step S1 in FIG. 3), and stores the registration instruction in the automatic operation process storage unit 32. The registration unit 37 outputs the received data of an automatic operation process to the CMDB update unit 33.

Figure 4:
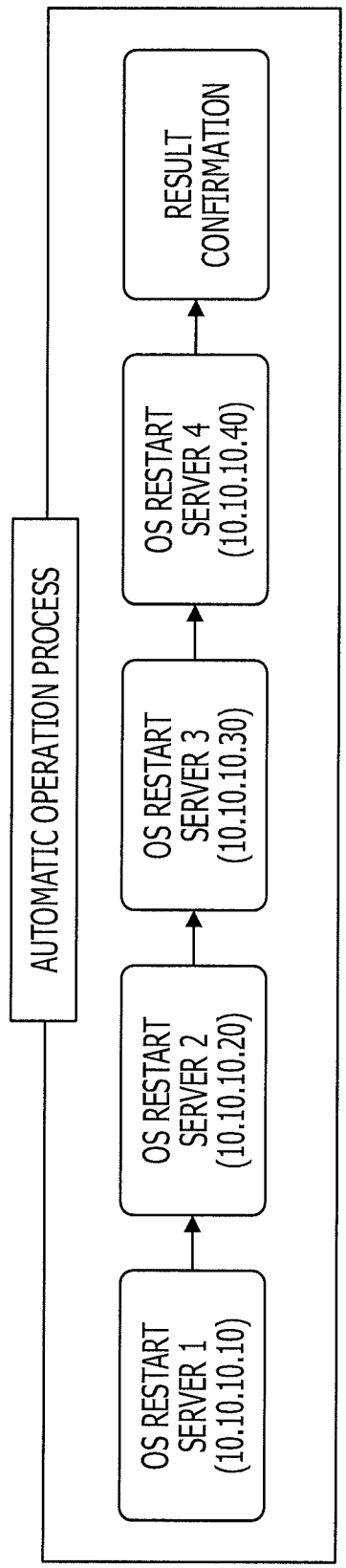
FIG. 4 is a diagram illustrating an example automatic operation process.
Figure 5:
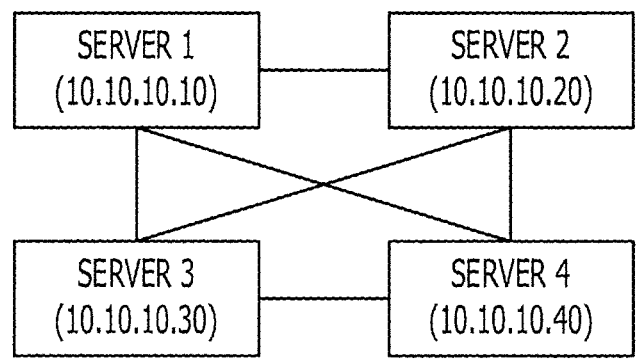
FIG. 5 is a diagram illustrating an example system recognized from an automatic operation process.

FIG. 4 illustrates an example automatic operation process according to this embodiment. Normally, each server which performs business operation processing has a role. In view of the role of each server, the order of start-up and stop of the server is designed in advance, and an automatic operation process (which will be also referred to as merely an "operation flow") is formed such that start-up and stop of the server is performed as designed as a series of operation controls. In an example illustrated in FIG. 4, OS start-up and result confirmation for four servers are ordered as operation controls. For each server, in addition to an IP address, for example, data (for example, an ID and a password) used for performing log-in is included. In the example illustrated in FIG. 4, for example, the relation among the four servers illustrated in FIG. 5 is specified. That is, it is understood that the four servers has some kind of relationship among them.

The CMDB update unit 33 extracts related server group and relation from the data of the automatic operation process which has been received from the registration unit 37 and newly registers the extracted server group and relation in the CMDB 31 (Step S3). Furthermore, the CMDB update unit 33 directly obtains a part of system information from each server of the extracted server group (Step S5). For example, loads on the network 1 and each server are reduced by logging in the server and extracting only data of an installed software. Note that various parameter values of the servers are relatively frequently updated, and therefore, each time the automatic operation process is executed, the parameter values are obtained and updated in the manner described below.

For example, the name or identifier, and related parameter value of the installed software of the system information schematically illustrated in FIG. 6 are read out. FIG. 6 illustrates an example in which a web server (Web Server) software is installed.

The CMDB update unit 33 specifies, on the basis of the installed software, the role of each server of the server group from setting data stored in the setting data storage unit 34 and sets it to the CMDB 31 (Step S7). The setting data used in this step is, for example, data illustrated in FIG. 7. In the example of FIG. 7, the role (WEB, DB, or the like) of each server is registered in association with a combination of the name and parameter value of an installed software. Thus, the role of the server is specified from the name of an installed software and the related parameter value.

Furthermore, the CMDB update unit 33 specifies, on the basis of the combination of the roles of servers, the system configuration of a system including the server group from the setting data stored in the setting data storage unit 34 and sets it to the CMDB 31 (Step S9).

The setting data used in this step is, for example, data illustrated in FIG. 8. In the example of FIG. 8, existing elements in the server group and the system configuration (the configuration Server Structure of a system to which the servers belong) are associated with each other. For example, when the roles of servers, that is, WEB, AP, and DB, are specified, it is specified that the system configuration is a three-layer structure system configuration of WEB-AP-DB. Also, when a WEB server has a multiplexed structure in which, for example, WEB×N (N is an integer equal to or more than 2), AP, and DB are multiplexed, a three-layer structure (WEB-AP-DB)+a load dispersion structure (WEB-LOAD-BALANCING) is specified.

Figure 9:
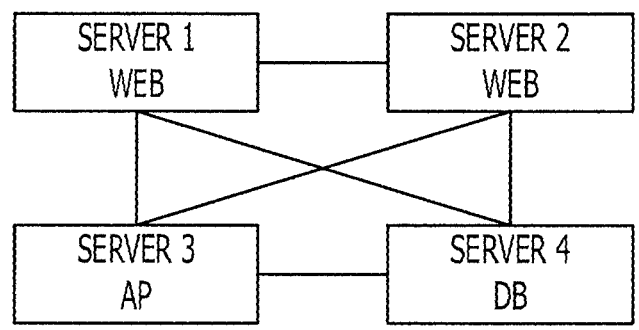
FIG. 9 is a diagram illustrating an example system configuration.

For example, as illustrated in FIG. 9, when an AP server, a DB server, and two WEB servers are specified as the roles of servers, a system configuration of the three-layer structure+ the load dispersion structure is specified.

FIG. 10 illustrates a data format example of configuration information stored in the CMDB 31. Note that the example of FIG. 10 indicates the system information of a single server. The system information includes the system information of the server, hard related parameters, OS related tuning parameters, kernel parameters, the name of the installed software, and application related tuning parameters.

The system information of the server includes the unique identifier of the server, the information update date, the IP address, the host name, the role of the server, and the configuration of the system to which the server belongs. Since, for the role of the server, there are cases where a single server has a plurality of roles, a plurality of roles might be registered. For the configuration of the system, there are cases where a plurality of types of system configurations, such as the three-layer structure+the load dispersion structure, corresponds, and in that case, a plurality of system configurations might be registered.

The hard related parameters include a CPU clock number, a physical memory size, a drive free capacity, an HDD capacity, and the like. The OS related tuning parameters include an OS type and the like. Furthermore, the kernel parameters include a virtual memory size and the like. Note that, in FIG. 10, information is indicated in a table format but may be indicated, for example, in an extensible markup language (XML) format.

As for the timing of registration of the automatic operation process, the automatic operation process is registered after a new system is constructed, which is a preferable timing for registering data of the system in the CMDB 31. Maintenance and management of the CMDB 31 are appropriately performed by newly registering the system information of the server, the installed software, and the like with the above-described timing.

Next, processing performed at execution of the automatic operation process will be described with reference to FIGS. 11-25.

Figure 11:
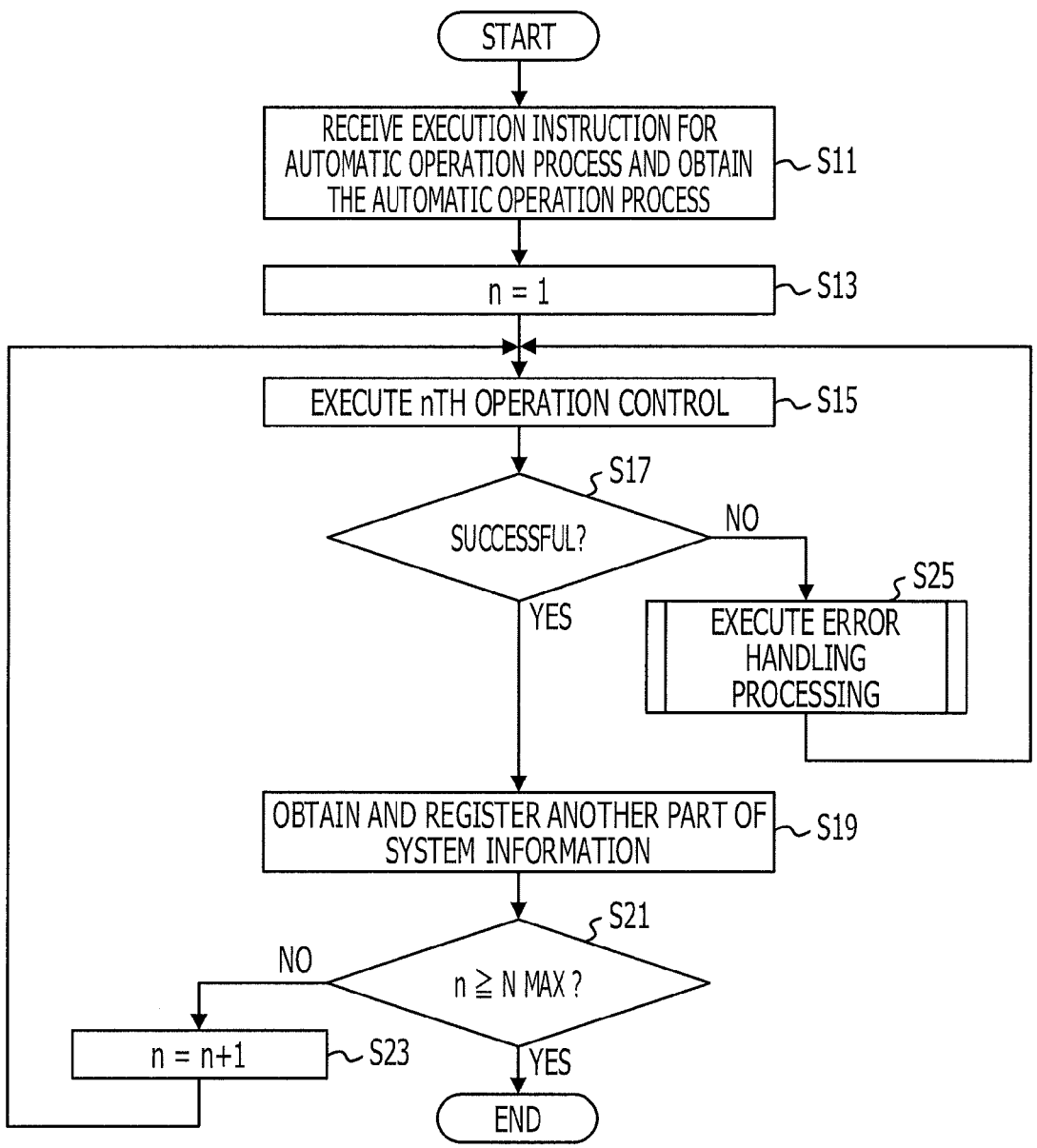
FIG. 11 is a flowchart illustrating a process flow performed at execution of an automatic operation process.

First, when the execution unit 35 receives an execution instruction for a specific automatic operation process, the execution unit 35 reads out the automatic operation process from the automatic operation process storage unit 32 (Step S11 in FIG. 11). Then, the execution unit 35 sets a counter n to 1 (Step S13). Thereafter, the execution unit 35 executes an nth operation control in the automatic operation process (Step S15). A specific operation control is not the main point of this embodiment, and therefore, the description thereof will be omitted.

The execution unit 35 determines whether or not the operation control executed in Step S15 was successful (Step S17). For example, when a return value sent from a target server of the operation control indicates that the operation control was successful, the execution unit 35 outputs data regarding the target server of the operation control to the CMDB update unit 33. Thus, the CMDB update unit 33 directly obtains another part of the system information from the target server of the operation control and registers the obtained part in the CMDB 31 (Step S19).

The another part (which will be also referred to as the "parameter value of the system") of the system information includes the state, setting, and configuration of the system. The configuration of the system includes information (for example, Nic×2, HDD×1, middles A, B, . . . , and the like) for a hardware, a middle, and the like, introduced in the system.

The state of the system includes information (for example, start-up and stop of the middle A, and the like) for each element of the "system information". The state of the system is registered as a type of a setting value. Furthermore, the setting of the system includes a setting value (for example, the number of Web servers coupled at one time) for each element of the "system information". The parameter values of the system as well as change history thereof are accumulated in the CMDB 31.

The hard related parameters, OS related tuning parameters, kernel parameters, and application related parameters, which have been described above, are relatively frequently changed, and thus, the CMDB 31 is automatically kept up-to-date by performing update each time the automatic operation process is executed. Also, in Step S19, only the above-described parameter values are obtained, and thus, a high load is not imposed on the network and the system.

Figure 12A:
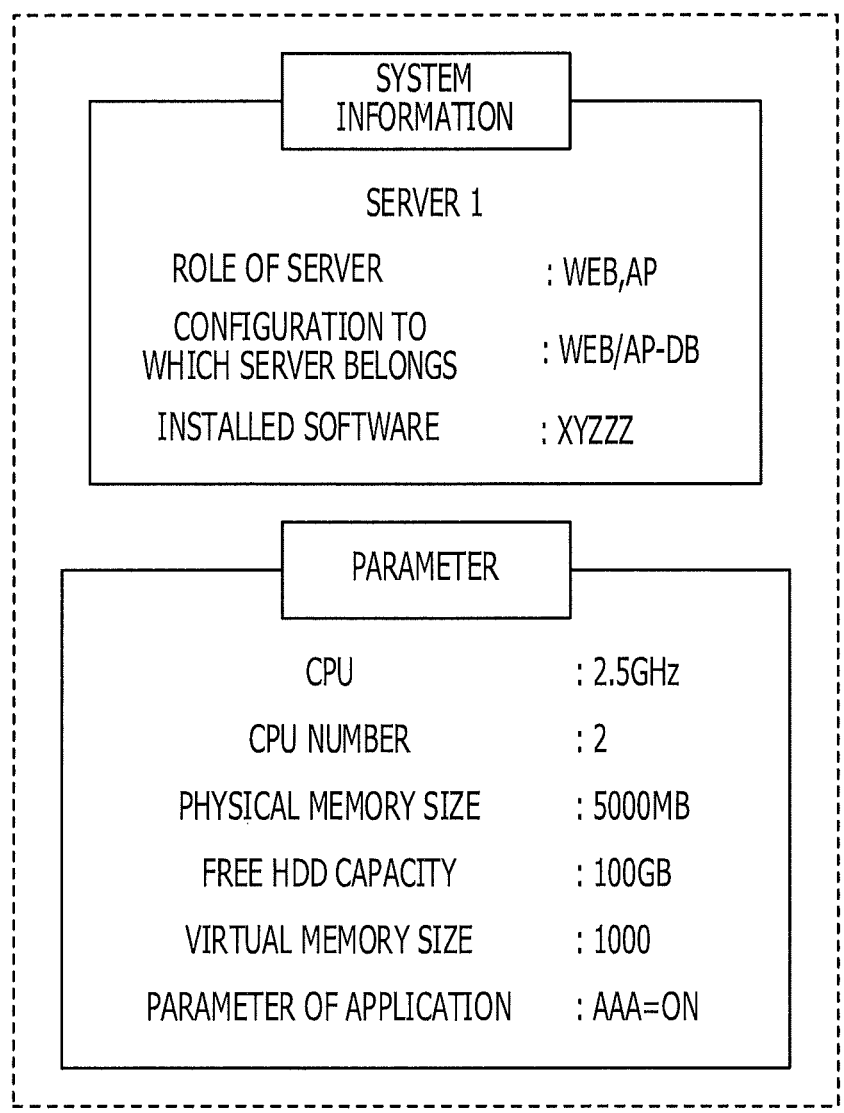
FIG. 12A is a diagram illustrating an example of data stored in CMDB.
Figure 12B:
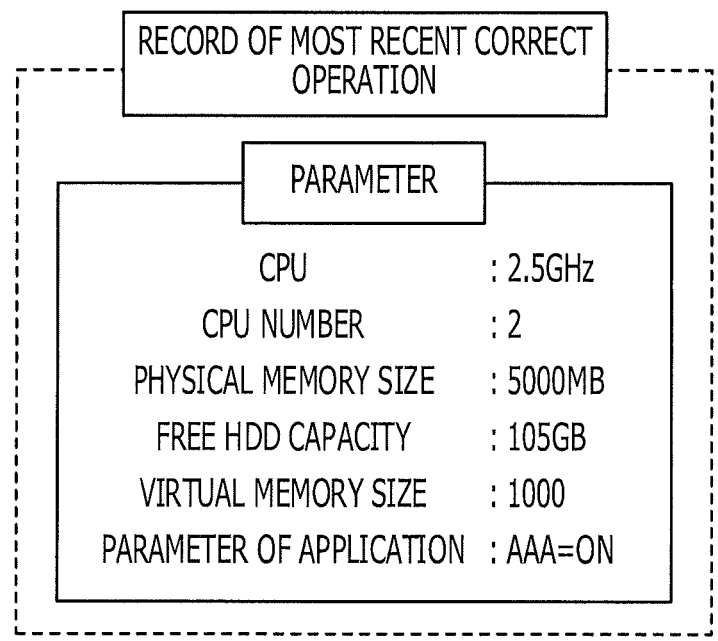
FIG. 12B is a diagram illustrating parameter values and the like at a most recent correct operation.

Note that, an example of data stored in the CMDB 31 is illustrated in FIG. 12A in order to describe the following steps. In FIG. 12A, data illustrated as the system information is data registered to the CMDB 31 when the automatic operation process is registered, data illustrated as parameters is data obtained in this step.

The execution unit 35 determines whether or not the counter number n is equal to or more than the number Nmax of the operation control performed in the automatic operation process (Step S21). If this condition is satisfied, the process is ended. Note that there are cases where processing of ending the process is executed, but such processing is not the main point of this embodiment, and therefore, the description thereof will be omitted. On the other hand, if the count number n is less than Nmax, the execution unit 35 increments n by 1 (Step S23) and causes the process to proceed to Step S15.

On the other hand, in Step S17, when an error is detected, the execution unit 35 outputs data regarding the error and the data of the automatic operation process to the error handing unit 36. The error handing unit 36 executes error handling processing (Step S25). After error handling processing is executed, the process returns to Step S15. That is, the same operation control is executed again. Although not illustrated in this process flow, for example, when the same operation control is executed and an error occurs twice, the errors are not appropriately handled by this process flow, and informing an operator that the errors are not appropriately handled by this process flow may be added. Error handling processing will be described with reference to FIGS. 13-25.

Figure 13:
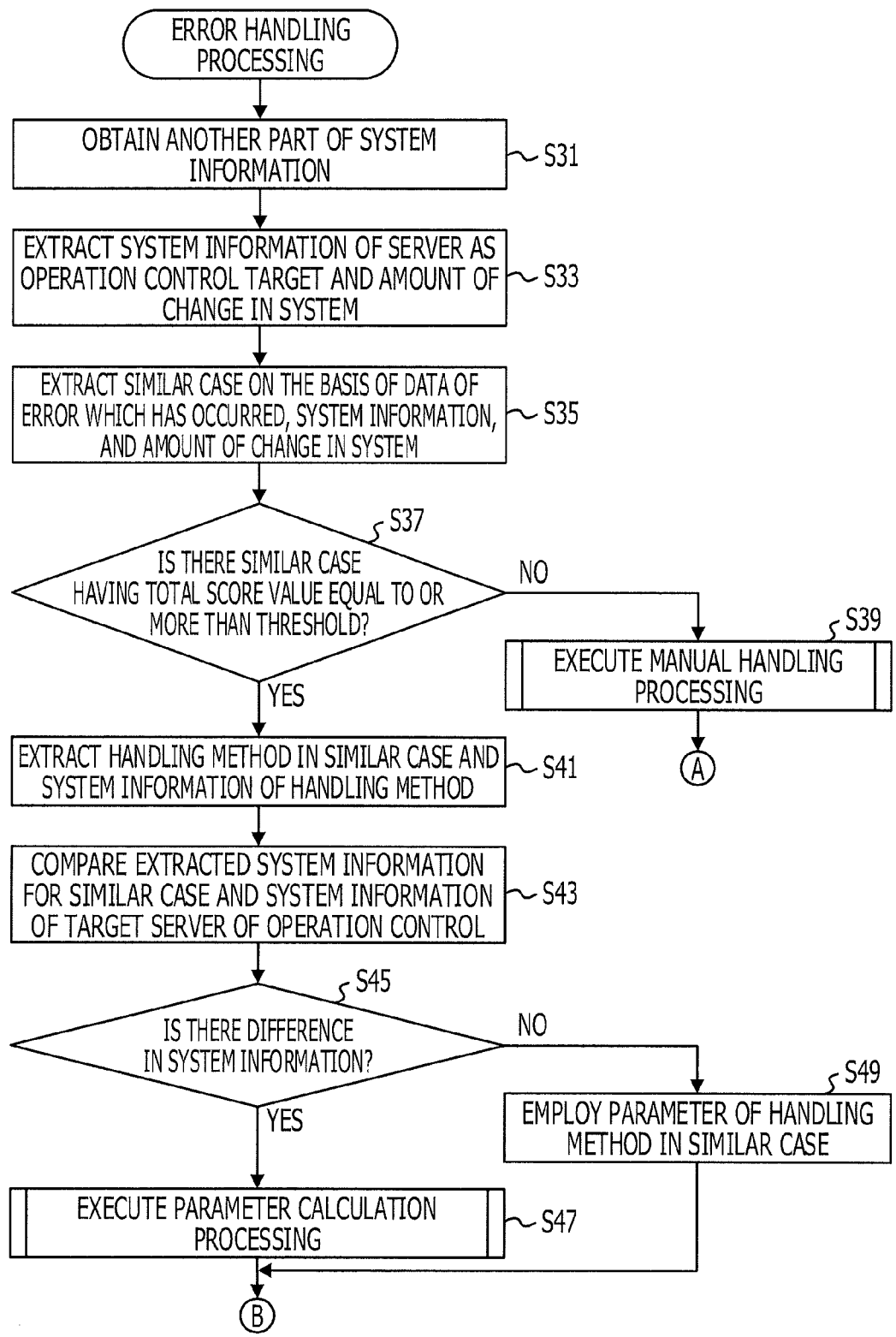
FIG. 13 is a flowchart illustrating a process flow of error handling processing.

The error handing unit 36 obtains another part of the system information for the server in which an error has occurred (Step S31 in FIG. 13). As for data obtained in this step, the same as that of Step S19 applies. In this case, for example, it is assumed that the parameter value in the lower part of FIG. 12A is obtained.

The extraction unit 361 of the error handing unit 36 reads out the system information of the operation control target including the parameter values at the most recent normal operation (that is, when the operation control was successful) from the CMDB 31, and the amount of change in the system, which is a difference from each of the parameter values obtained in Step S31 is extracted (Step S33). For example, assume that the parameter values indicated in FIG. 12A are obtained as parameter values at the most recent normal operation. Viewing a difference between each of the parameter values in FIG. 12A and the corresponding one of the parameter values of FIG. 12B, a decrease in the HDD free capacity from 105 GB to 100 GB is seen. Note that, in this case, the system information (the role of the server, the configuration of the system to which the server belongs, the data of the installed software, and the like) indicated in the upper part of FIG. 12A is read out from the CMDB 31.

The extraction unit 361 extracts the most similar case (or the same case, if there is one) is extracted from the CMDB 31 in terms of the executed operation control, the contents of the error, the amount of change in the system, the installed software, at least a part of the parameter values thereof, the role of the server, and the configuration of the system to which the server belongs (Step S35). Note that the term "case" might be referred to as an "event".

Similar case data in the format illustrated in FIG. 14 is registered in the CMDB 31. The data of the similar case includes information of the similar case, information of an error which has occurred, information of the executed operation control, a handling method for the error, and the contents of the handling method. The information of the similar case includes a unique identifier, a case name, system information (which is the same as the system information in the configuration information), a difference in the system information, the information of an error which has occurred, and a handling method for handling the error. There are cases where the handling method for handling the error includes a plurality of handling methods. The information for the error which has occurred includes the type of the error which has occurred, an error code, an error message, and the executed operation control. The executed operation control includes at least an operation control type and operation control contents. The handling method for the error includes a handling method type, the contents of the handling method, the role of a server on which handling has been performed, and the system information of the server on which handling has been performed. The contents of the handling method include the specific contents of the handling method, a parameter of the handling method, and a confirmation method of the handling method. Note that the data is indicated in a table format in FIG. 14, but may be indicated, for example, in the extension markup language (XML) format.

Figure 15:
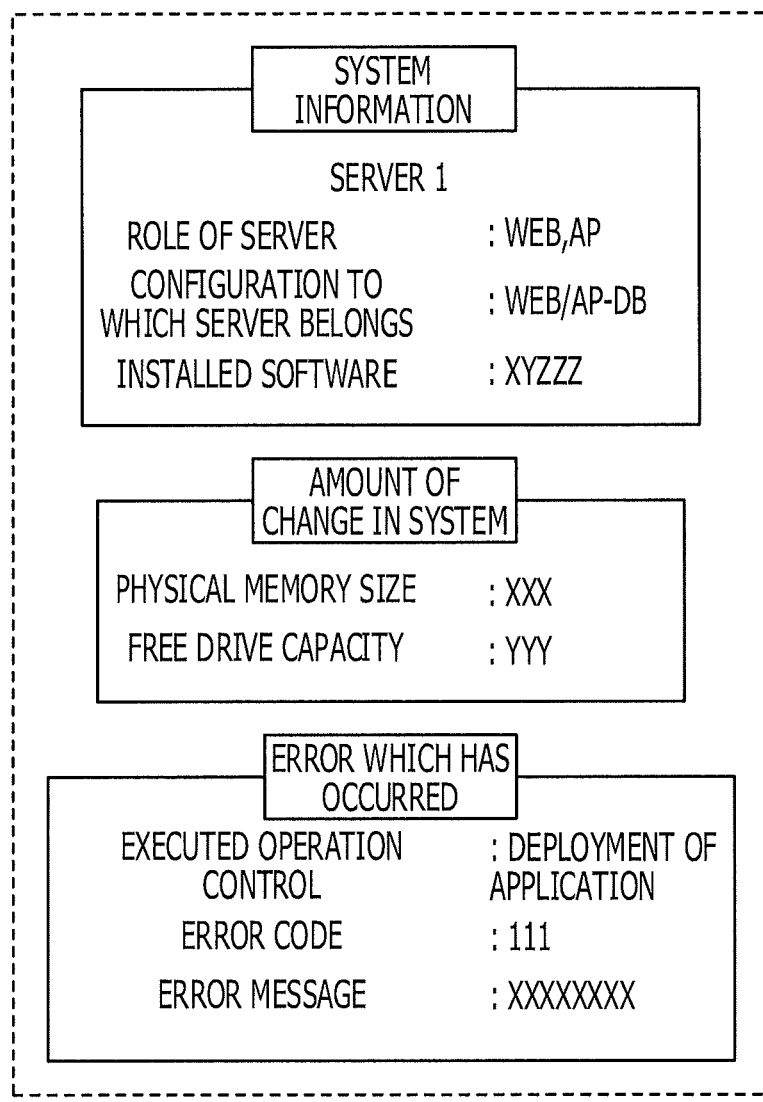
FIG. 15 is a diagram illustrating an example search condition.

Accordingly, the extraction unit 361 executes similarity search to data of the similar case accumulated in the CMDB 31 using the data illustrated in FIG. 15 as a search condition (the system information, the amount of change in the system, and the data regarding the error which has occurred). Specifically, for example, when, for each element of the search condition, data for the error which has occurred and data for the similar case match each other, the score is set to be 100 and, if there is a difference therebetween, the score is set to be a value corresponding to the magnitude of the difference. For example, as illustrated in FIG. 16, the score is set for each of the operation control, the error contents, the amount of change in the system, the system information, the role of the server, and the configuration of the system, and the total value of the scores is calculated. Then, the total value of the scores calculated for each similar case is compared to that of another, the similar case having the largest total value of the scores is specified. Note that a threshold is set in advance and the similar case for which only a total value less than the threshold is obtained is handled as a non-similar case.

In this embodiment, as described above, each time the automatic operation process is registered and the automatic operation process is executed, the CMDB 31 is updated and a state in which correct system information is registered in the CMDB 31 at any time is maintained, and therefore, the above-described similar case search is appropriately functioned. When wrong system information is registered, the amount of change in the system is also calculated incorrectly, and the system information also varies. Therefore, the search condition is not appropriately set, the contents of the similar case do not correctly indicate an error, and thus, a correct similar case is not extracted.

Figure 17:
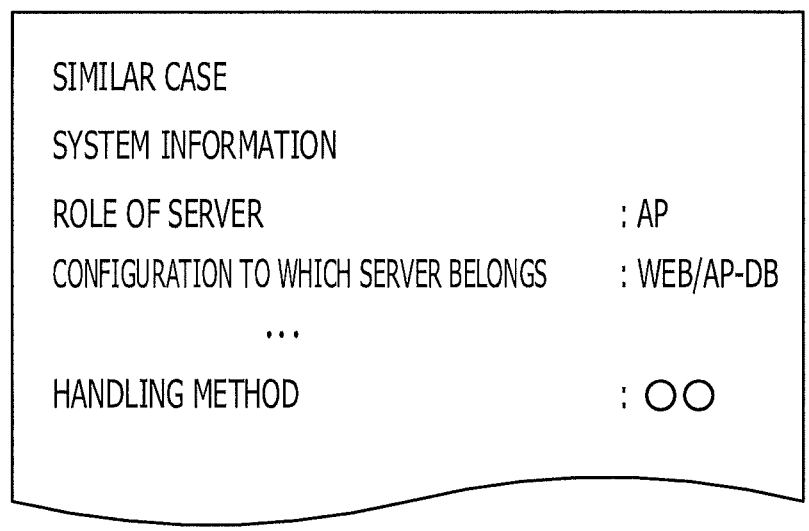
FIG. 17 is a diagram illustrating an example of an extracted similar case.
Figure 18:
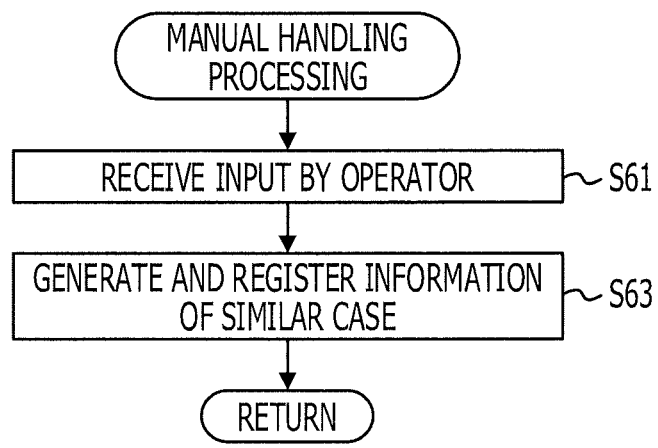
FIG. 18 is a flowchart illustrating a process flow of manual handling processing.
Figure 19:
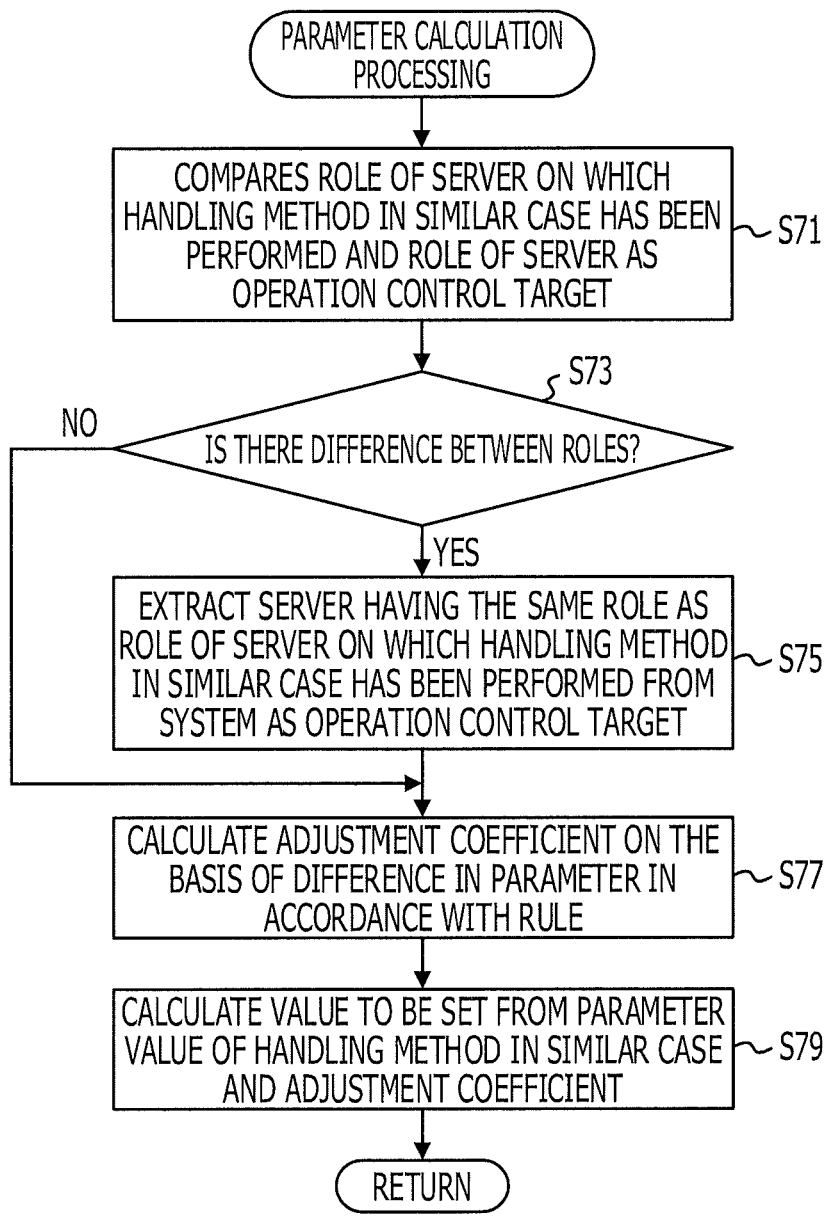
FIG. 19 is a flowchart illustrating a process flow of parameter calculation processing.

The above-described similar case search is performed to extract data for a single similar case, for example, as schematically illustrated in FIG. 17. In this embodiment, the role of the server, the configuration of the system to which the server belongs, and the handling method are major data.

Thereafter, the extraction unit 361 determines whether or not there is a similar case for which the total score value is equal to or more than the threshold (Step S37). When there is no similar case for which the total score value is equal to or more than the threshold, the extraction unit 361 outputs a processing start instruction to the manual handling unit 363. The manual handling unit 363 executes manual handling processing in accordance with the instruction (Step S39). Then, the process returns to processing of a calling source via a terminal A. Manual processing will be described with reference to FIG. 18.

The manual handling unit 363 notifies the operator of the data of an error which has occurred, the data of an operation control, and the occurrence of the error to cause the operator to manually perform handing processing, and obtains data for a handing method input by the operator (Step S61). The manual handling unit 363 generates information for the similar case from the parameter value obtained in Step S31, the system information obtained in Step S33, the amount of change in the system calculated in Step S33, and the data of the handing method obtained in Step S61, and registers the generated information in the CMDB 31 (Step S63). Thus, a new case is accumulated.

Note that manual handing itself is the same as that of the related art, but the contents of data to be accumulated are different from those of the related art. Specifically, this embodiment is different from the related art in that the role of the server, the configuration of the system to which the server belongs, the amount of change in the system, and the like are included in the contents of data to be accumulated.

Returning to the processing of FIG. 13, if there is a similar case for which the total score value is equal to or more the threshold, the extraction unit 361 outputs data of the extracted similar case and data for the server in which an error has occurred to the calculation unit 362. The calculation unit 362 extracts data of the handing method in the similar case and system information of the system on which handing has been performed (Step S41).

The calculation unit 362 compares the system information extracted for the similar case and the system information of the target server of the operation control in which an error has occurred (Step S43) to determine whether or not there is a difference in system information (Step S45). If there is no difference in system information, the calculation unit 362 uses the parameter used in the similar case handing method as they are (Step S49). This is because, if the extracted system information and the system information of the target server match each other, there is no problem even when the parameters used in the similar case handing method are used as they are. Then, the process proceeds to the processing of FIG. 23 via a terminal B. On the other hand, if there is a difference in system information, the calculation unit 362 executes parameter calculation processing (Step S47). Parameter calculation processing will be described with reference to FIGS. 19-22B.

The calculation unit 362 compares the role of the server on which the handling method in the similar case has been performed and the role of the server of the operation control with each other (Step S71). If there is not a difference between the roles of the servers (No in Step S73), the process proceeds to Step S77.

For example, assume that a phenomenon in which a DB connection error occurs when a predetermined operation control is performed with an AP server serving as an operation control target. In contrast, if the role of the server in the extracted similar case on which the handling method has been performed is a DB server, handing is to be executed on the DB server, not the AP server serving as an operation control target this time, too. Therefore, in this step, the roles of the servers are compared with each other.

On the other hand, if there is a difference between the roles of the servers (YES in Step S73), the calculation unit 362 extracts a server having the same role as the role of the server on which the handling method in the similar case has been performed from the system to which the server of the operation control target belongs (Step S75). Furthermore, the calculation unit 362 reads out the system information of the server having the same role from the CMDB 31. Thus, the same handling method as the handling method performed to the similar case is executed. Note that, if a plurality of servers having the same role is included in the system, for example, in the above-described example, the DB server in which the phenomenon of the DB connection error has occurred is selected. As another option, a server in which the same error as the error which had occurred in the similar case has occurred is selected.

Thereafter, the calculation unit 362 calculates an adjustment coefficient on the basis of a difference between each of the parameter values of the system in the similar case and the corresponding one of the parameter values of the server in the error occurrence system, which has the same role, in accordance with a predetermined rule (Step S77).

In this case, if the handling method of the similar case is a method in which "a virtual memory value is increased by 2000", the parameter value (which is also referred to as a setting value) of "2000" in the handling method is adjusted by multiplying it by the adjustment coefficient on the basis of the difference in the parameter value between the servers.

For example, assume that the parameter values of a system in a similar case are data illustrated in FIG. 20 and the parameter values of a server in an error occurrence system having the same role as that of the system are data illustrated in FIG. 21. It is seen that, in this example, there are differences in actual memory, access multiplicity of the middle A, and allocated memory of the middle A.

In this case, the ratios, that is, 4000/5000=0.8, 60/50=1.2, and 40/30=1.33 are obtained for the actual memory, the access multiplicity, and the allocated memory, respectively. Note that the inverse ratio and the direct ratio are employed for the value of a resource (the actual memory, the virtual memory, or the like) and the value (the setting value of a software) of a part which uses a resource, respectively.

Weighting data is stored in the setting data storage unit 34 for each error type in advance. For example, the weighting data illustrated in FIG. 22A is used for an error related to a physical memory. Furthermore, the weighting data illustrated in FIG. 22B is used for an error related to a disk space. Thus, if an error which occurs this time is an error related to a physical memory, the ratio calculated above in accordance with the weighting data illustrated in FIG. 22A is weighted-summed, and an adjustment coefficient is calculated. Thus, the ratio indicating a difference in parameter is weighted in accordance with an error type. For example, if an error which occurs is an error related to a physical memory, the weight of the actual memory is set to be large.

Adjustment coefficient=0.8×1.5+1.2×1+1.33× 1.2=3.996

The calculation unit 362 calculates a value which is to be set from the parameter value used in the handing method in the similar case and the adjustment coefficient (Step S79). For example, the value which is to be set is calculated on the basis of a product of the parameter value and the adjustment coefficient. In the above-described example, 2000×3.996=7992 is calculated.

Thus, the parameter value used in the handling method in the similar case is appropriately changed in accordance with the difference in parameter value between the servers and the error type. The calculation unit 362 outputs the calculated value to the handling flow generation unit 364.

Figure 23:
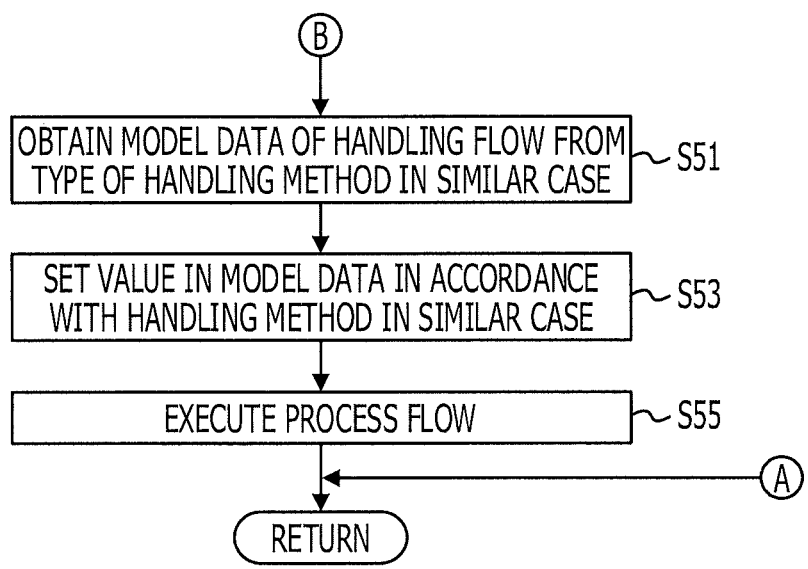
FIG. 23 is a flowchart illustrating a process flow of error handling processing.

The process proceeds to processing of FIG. 23, and the handling flow generation unit 364 reads out model data of the handling flow from the setting data storage unit 34 on the basis of the type of the handling method in the similar case (Step S51). For example, assume that the model data of the handling flow illustrated in FIG. 24 is stored in the setting data storage unit 34. In the example of FIG. 24, a model for a handling type of command execution and a model for a handling type of file editing are indicated. For the model data used for command execution, a command type, an argument, and a return value that is to be confirmed may be set. For the model data for filing editing, a file path, edit contents (a parameter value) may be set.

Figure 25:
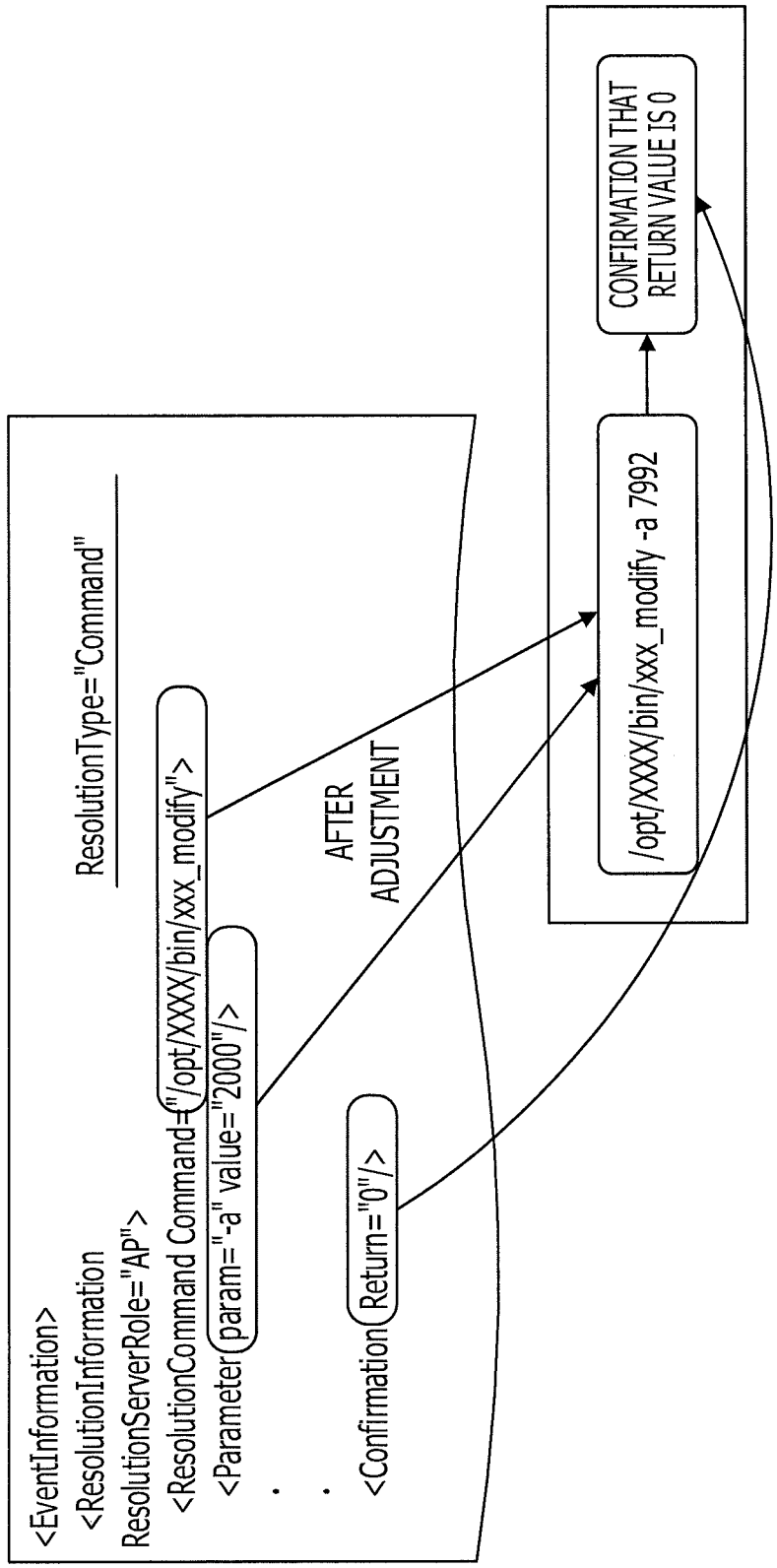
FIG. 25 is a diagram schematically illustrating the generation of an error handling process flow.

The handling flow generation unit 364 sets values to the model data in accordance with the handling method in the similar case (Step S53). The parameter value calculated in Step S47 is set to the model data. Schematically illustrating this step, as illustrated in FIG. 25, when the handling method is command execution, the specified commend "/opt/XXXX/bin/xxx_modify" is set to the model data for command execution, the value "7992" obtained by adjustment performed in Step S47 is set for the parameter value, and the return value "0" which is to be confirmed is set.

The handling flow generation unit 364 outputs the handling flow generated as described above to the execution unit 35, and the execution unit 35 executes the generated handling flow (Step S55). Note that, if the return value which is to be confirmed is not a correct value, it is assumed that handling was not correctly performed due to an error and manual handling processing is executed. If the return value which is to be confirmed is a correct value, the process returns to the processing of the calling source. In order to accumulate data for the similar case in the CMDB 31, the system information of the operation control target, the employed handling method (including the parameter value calculated in Step S47), and the amount of change in system are maintained.

Note that, when error handling processing of Step S25 is ended, the process returns to Step S15 and the same operation control is executed again. Then, if the operation control was successful, error handling has been appropriately performed, and therefore, in Step S19 performed after error handling, the error handing unit 36 causes the CMDB update unit 33 to additionally register data for the above-described similar case. Thus, a new error is automatically handled.

By executing the above-described processing, a handling method may be appropriately extracted and, furthermore, an error may be automatically handled. Thus, the operation cost may be reduced and the operation ratio of a system may be improved.

Note that it is advantageously effective merely that a handling method is appropriately extracted. That is, even when the processing until the above-described process of extracting a similar case and data of a handling method is executed, sufficient advantageous effects may be achieved. Other than that, even when the processing is automatically performed until a certain stage, the advantageous effect of the processing until the certain stage may be achieved.

Furthermore, the CMDB 31 may be appropriately updated to a latest state. Thus, a similar case may be appropriately extracted.

An embodiment of the present technology has been described above, but the present technology is not limited thereto. For example, the function block configuration of the management server 3 illustrated in FIG. 2 is merely an example, and there might be cases where it does not correspond to a program module configuration. Also, the function of the management server 3 may be executed using one or more computers. Moreover, the example in which data of a similar case is also stored in the CMDB 31 has been illustrated, but it may be held separately from data of a system configuration.

Figure 26:
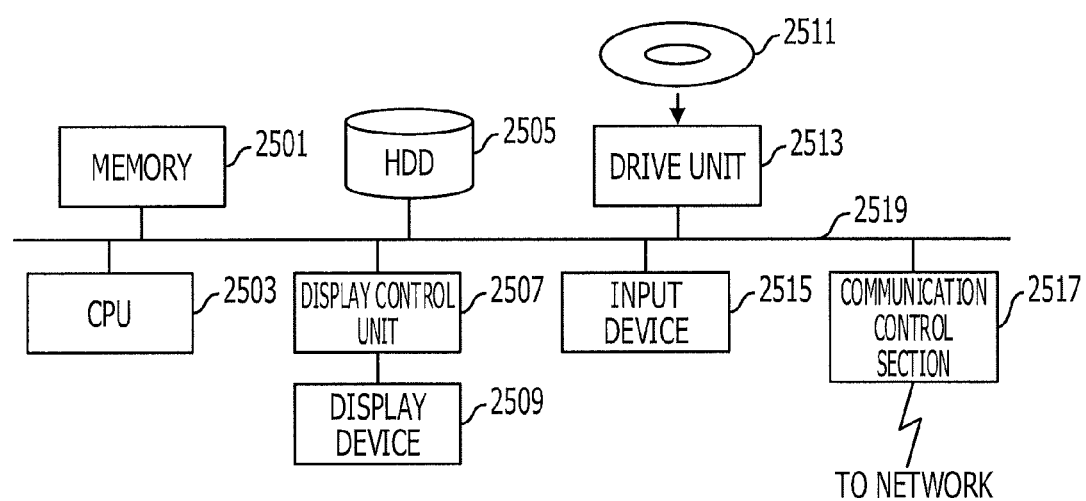
FIG. 26 is a function block diagram of a computer.

Note that the servers 7, the management server 3, and the operator terminal 5, which have been described above, are one or more computer devices and, as illustrated in FIG. 26, a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 used for providing connection to a network are coupled together via a bus 2519. An operating system (OS) and an application program used for performing processing in this embodiment are stored in the HDD 2505 and, when being executed by the CPU 2503, the OS and the application program are read out from the HDD 2505 to the memory 2501. The CPU 2503 controls the display control unit 2507, the communication control unit 2517, and the drive device 2513 in accordance with processing contents of the application program and causes each of them to perform a predetermined operation. Data which is currently being processed is mainly stored in the memory 2501, but may be stored in the HDD 2505. In this embodiment of the present technology, the application program used for performing the above-described processing is stored in a computer-readable removable disk 2511 to be distributed and is installed from the drive unit 2513 to the HDD 2505. There are also cases where the application program is installed in the HDD 2505 via a network such as the Internet and the communication control section 2517. In such a computer device, a hardware, such as the CPU 2503, the memory 2501, and the like, which have been described above, and a program, such as the OS and the application program, organically function in concert to realize each of the various functions described above.

The embodiments of the present technology described above may be summarized as follows.

An information processing method according to a first embodiment of the present technology includes (A) reading out, when an operation control in an automatic operation process used for automatically executing an operation control for a plurality of computers is executed, if an error is detected in one computer of the plurality of computers, the role of the one computer and the configuration of the system to which the one computer belongs from a configuration information storage unit that stores configuration information including at least the configuration of a system including the plurality of computers and the role of each of the plurality of computers, and (B) reading out from a data storage unit that stores case data including the contents of an operation control, the contents of an error, the role of one computer of the plurality of computers in which the error has occurred, the configuration of a system to which the one computer belongs, and a handling method, case data including a condition which matches or is similar to a condition that includes at least the contents of the operation control, the contents of the error, the role of the one computer, the configuration of the system to which the one computer belongs.

Thus, the case data may be appropriately extracted using the role of the one computer and the configuration of the system to which the one computer belongs.

The information processing method according to the first embodiment may further include (C) accessing, when an automatic operation process is registered, each of the plurality of computers which is a target of the automatic operation process, specifying, on the basis of the type of a program installed in the computer, the role of the computer, specifying, on the basis of the roles of the plurality of computers, the configuration of a system including the plurality of computers, and storing the specified role of the computer and the specified configuration of the system in the configuration information storage unit. Thus, the configuration information may be appropriately managed by registering the configuration information when the automatic operation process is registered.

The information processing method according to the first embodiment may further include (D) accessing, when each operation control in an automatic operation process is successfully executed, each of the plurality of computers, reading out a first parameter value of the computer, and storing the read out first parameter value in the configuration information storage unit. Thus, the parameter of the computer may be appropriately maintained.

In the processing of reading out described above, the first parameter value of the one computer may be further read out. The information processing method according to the first embodiment may further include (E) accessing the one computer and obtaining a second parameter value that is a current parameter value of the one computer. Furthermore, in this case, the above-described condition may include a difference between the first parameter value and the second parameter value. Since the configuration information storage unit is appropriately maintained, the extent of parameter value fluctuation may be also used as a server condition.

Furthermore, the above-described handling method may include the role of a second computer on which the handling method has been performed, a parameter value of the second computer, a parameter value used for the handling method, and the contents of the handling method. In this case, the information processing method according to the first embodiment may further include (F) determining whether or not the role of the second computer included in the read out case data and the role of the one computer match each other, (G) specifying, when the role of the second computer and the role of the one computer do not match each other, a third computer having the role of the second computer in the system to which the one computer belongs from the configuration information storage unit, (H) reading out a parameter value of the third computer from the configuration information storage unit, and (I) changing the parameter value used in the handling method on the basis of the parameter value of the second computer and the parameter value of the third computer.

Thus, when a computer in which an error has occurred and a computer to which a handling method is to be performed are different, a parameter used for the handling method may be appropriately changed.

Moreover, the information processing method according to the first embodiment may further include (J) reading out, from a second data storage unit that stores model data of an automatic error handing flow corresponding to the contents of a handling method, the model data of the automatic error handing flow corresponding to the contents of the handling method included in the handing method, (K) setting a changed parameter value in the model data to generate an automatic error handing flow, and (L) executing the automatic error handing flow. Thus, an error may be automatically handled.

An information processing method according to a second embodiment of the present technology includes (M) accessing, when an automatic operation process used for automatically executing an operation control for a plurality of computers is newly registered, each of the plurality of computers which is a target of the operation control of the automatic operation process to specify the role of the computer on the basis of the type of a program installed in the computer, (N) specifying the configuration of a system including the plurality of computers on the basis of the roles of the plurality of computers and storing the configuration of the system with the roles of the plurality of computers in a configuration information storage unit, and (P) accessing, when each operation control in the automatic operation process is successfully executed, each of the plurality of computers, reading out a first parameter value of the computer, and performing update and registration in the configuration information storage unit.

Thus, configuration information may be appropriately and correctly maintained and managed.

Note that a program used for causing a computer to perform the above-described processing may be generated, and the program is stored in a computer-readable storage medium or a memory device, such as, an optical disk, such as, for example, a flexible disk, a CD-ROM, and the like, a magnetic optical disk, a semiconductor memory (for example, a ROM), a hard disk, and the like, or a memory device. Note that data which is currently being processed is temporarily held in a memory device, such as a RAM and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method comprising:
obtaining, when an operation control in an automatic operation process used for automatically executing an operation control for a plurality of computers is executed, in response to an error being detected in a first computer among the plurality of computers, first information that indicates a role of the first computer and second information that indicates a configuration of a system to which the first computer belongs;
obtaining case data including a condition that matches or is within a predetermined threshold to a condition that includes at least contents of the operation control, contents of the error, the role of the first computer indicated by the first information and the configuration of the system to which the first computer belongs which is indicated in the second information;
accessing, when the operation control in the automatic operation process is successfully executed, each of the plurality of computers;
obtaining a first parameter value from each of the plurality of computers; and
storing each of the first parameter values in a storage.

2. The information processing method according to claim 1, further comprising:
specifying the roles of the plurality of computers based on a type of a program installed in each of the plurality of computers;
specifying the configuration of a system including the plurality of computers based on the roles of the plurality of computers; and
storing information indicating the specified configuration of the system.

3. The information processing method according to claim 1, further comprising:
accessing the first computer; and
obtaining a second parameter value which is a current parameter value of the first computer,
wherein the condition includes a difference between the first parameter value and the second parameter value.

4. The information processing method according to claim 1, further comprising:
specifying, when a role of a second computer and the role of the first computer which are included in the case data do not match each other, a third computer which is included in the system to which the first computer belongs and has a same role as the role of the second computer;
obtaining a parameter value of the third computer; and
changing a parameter value used in a handling method based on a parameter value of the second computer and a parameter value of the third computer,
wherein the handling method includes the role of the second computer on which the handling method has been performed, the parameter value of the second computer, the parameter value used in the handling method, and contents of the handling method.

5. The information processing method according to claim 4, further comprising:
obtaining model data of a flow corresponding to the handling method included in the handling method;
generating an automatic error handling flow in which the changed parameter value is set to the model data; and
executing the automatic error handling flow.

6. An apparatus comprising:
a memory; and
a processor coupled to the memory and configured to:
obtain, when an operation control in an automatic operation process used for automatically executing an operation control for a plurality of computers is executed, in response to an error being detected in a first computer among the plurality of computers, first information that indicates the role of the first computer and second information that indicates the configuration of a system to which the first computer belongs,
obtain case data including a condition which matches or is within a predetermined threshold to a condition that includes at least the contents of the operation control, contents of the error, the role of the first computer indicated by the first information, and the configuration of the system to which the first computer belongs which is indicated by the second information, access, when the operation control in the automatic operation process is successfully executed, each of the plurality of computers,
obtain a first parameter value from each of the plurality of computers, and
store the first parameter value in a storage.

7. The apparatus according to claim 6, wherein the processor is configured to:
specify the roles of the plurality of computers based on a type of a program installed in each of the plurality of computers,
specify the configuration of a system including the plurality of computers based on the roles of the plurality of computers, and
store information indicating the specified configuration of the system.

8. The apparatus according to claim 6, wherein the processor is configured to:
access the first computer, and
obtain a second parameter value which is a current parameter value of the first computer, and
wherein the condition includes a difference between the first parameter value and the second parameter value.

9. The apparatus according to claim 6, wherein the processor is configured to:
specify, when a role of a second computer and the role of the first computer which are included in the case data do not match each other, a third computer which is included in the system to which the first computer belongs and has a same role as the role of the second computer,
obtain a parameter value of the third computer, and
change a parameter value used in a handling method based on a parameter value of the second computer and a parameter value of the third computer, and
wherein the handling method includes the role of the second computer on which the handling method has been performed, the parameter value of the second computer, the parameter value used in the handling method, and the contents of the handling method.

10. The apparatus according to claim 9, wherein the processor is configured to:
obtain model data of a flow corresponding to the contents of the handling method included in the handling method,
generate an automatic error handling flow in which the changed parameter value is set in the model data, and
execute the automatic error handling flow.

11. A non-transitory computer-readable recording medium storing a program for causing a computer to execute a process, the process comprising:
obtaining, when an operation control in an automatic operation process used for automatically executing an operation control for a plurality of computers is executed, in response to an error being detected in a first computer among the plurality of computers, first information that indicates the role of the first computer and second information that indicates the configuration of a system to which the first computer belongs;
obtaining case data including a condition that matches or is within a predetermined threshold to a condition that includes at least the contents of the operation control, contents of the error, the role of the first computer indicated by the first information and the configuration of the system to which the first computer belongs which is indicated in the second information;
accessing, when the operation control in the automatic operation process is successfully executed, each of the plurality of computers;
obtaining a first parameter value from each of the plurality of computers; and
storing the first parameter value in a storage.

12. The non-transitory computer-readable recording medium according to claim 11, wherein the process further comprises
specifying the roles of the plurality of computers based on a type of a program installed in each of the plurality of computers;
specifying the configuration of a system including the plurality of computers based on the roles of the plurality of computers; and
storing information indicating the specified configuration of the system.

13. The non-transitory computer-readable recording medium according to claim 11, wherein the process further comprises:
accessing the first computer; and
obtaining a second parameter value which is a current parameter value of the first computer, and
wherein the condition includes a difference between the first parameter value and the second parameter value.

14. The non-transitory computer-readable recording medium according to claim 11, wherein the process further comprises:
specifying, when a role of a second computer and the role of the first computer which are included in the case data do not match each other, a third computer which is included in the system to which the first computer belongs and has a same role as the role of the second computer;
obtaining a parameter value of the third computer; and
changing a parameter value used in a handling method based on a parameter value of the second computer and a parameter value of the third computer, and
wherein the handling method includes the role of the second computer on which the handling method has been performed, the parameter value of the second computer, the parameter value used in the handling method, and the contents of the handling method.

15. The non-transitory computer-readable recording medium according to claim 14, wherein the process further comprises:
obtaining model data of a flow corresponding to the handling method included in the handling method;
generating an automatic error handling flow in which the changed parameter value is set to the model data; and
executing the automatic error handling flow.

* * * * *